United States Patent
Shveidel et al.

(10) Patent No.: US 11,256,549 B2
(45) Date of Patent: Feb. 22, 2022

(54) METHOD AND APPARATUS FOR THREAD SCHEDULING

(71) Applicant: EMC IP HOLDING COMPANY LLC, Hopkinton, MA (US)

(72) Inventors: Vladimir Shveidel, Pardes-Hana (IL); Ronen Gazit, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 93 days.

(21) Appl. No.: 16/654,270

(22) Filed: Oct. 16, 2019

(65) Prior Publication Data

US 2021/0117238 A1 Apr. 22, 2021

(51) Int. Cl.
*G06F 9/50* (2006.01)
*G06F 9/54* (2006.01)
*G06F 9/48* (2006.01)

(52) U.S. Cl.
CPC ............ *G06F 9/5038* (2013.01); *G06F 9/485* (2013.01); *G06F 9/4881* (2013.01); *G06F 9/546* (2013.01); *G06F 2209/5018* (2013.01)

(58) Field of Classification Search
CPC .................................................. G06F 9/5038
See application file for complete search history.

(56) References Cited

U.S. PATENT DOCUMENTS

| | | | | |
|---|---|---|---|---|
| 7,774,374 | B1* | 8/2010 | Kizhepat | H04L 49/254 |
| | | | | 707/800 |
| 10,216,668 | B2* | 2/2019 | Wang | G06F 12/1027 |
| 10,754,706 | B1* | 8/2020 | Mo | G06F 9/4887 |
| 2003/0172104 | A1* | 9/2003 | Hooman | G06F 9/4881 |
| | | | | 718/103 |
| 2013/0246427 | A1* | 9/2013 | Murata | G06F 16/00 |
| | | | | 707/737 |
| 2016/0266928 | A1* | 9/2016 | Rimoni | G06F 9/5011 |
| 2020/0210228 | A1* | 7/2020 | Wu | G06N 3/0454 |

* cited by examiner

*Primary Examiner* — Charlie Sun
(74) *Attorney, Agent, or Firm* — Daly, Crowley, Mofford & Durkee, LLP (57) ABSTRACT

A method is provided for use in computing system, comprising: instantiating a plurality of scheduler queues; instantiating a plurality of type-1 threads; assigning each of the plurality of type-1 threads to a respective scheduler queue; allocating a plurality of budgets to the plurality of scheduling of queues, each of the plurality of budgets being allocated to a different one of the plurality of scheduling queues; selecting one of the plurality of scheduling queues; retrieving a type-1 thread from the selected scheduling queue when one of a first condition or a second condition is satisfied, the first condition being satisfied when the respective budget of the queue is not exhausted, and the second condition being satisfied when another one of the plurality of scheduling queues are empty; and executing the retrieved type-1 thread.

17 Claims, 8 Drawing Sheets

| QUEUE IDENTIFIER | BUDGET AMOUNT |
|---|---|
| READY_QUEUE_0 312 | BUDGET_0 314 |
| READY_QUEUE_1 312 | BUDGET_1 314 |
| READY_QUEUE_2 312 | BUDGET_2 314 |
| READY_QUEUE_3 312 | BUDGET_3 314 |

```
th_id get_next_ready_thread()function:
{
10:   th_id = NULL;
20:   was_idle_pass = FALSE;
30:   while (TRUE)
      {
40:     for (cos= 0; cos++; cos<N)
        {
          if (cos->queue is not empty && (was_idle_pass || cos->budget_remainder > 0))
50:       {
            th_id = Dequeue(cos->queue);
            break;
          }
        }
60:     if (th_id != NULL)
          return th_id;
70:     if (was_idle_pass)
          return NULL;
80:     was_idle_pass = TRUE;
      }
}
```

METHOD AND APPARATUS FOR THREAD SCHEDULING

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in computing system, comprising: instantiating a plurality of scheduler queues; instantiating a plurality of type-1 threads; assigning each of the plurality of type-1 threads to a respective scheduler queue; allocating a plurality of budgets to the plurality of scheduling of queues, each of the plurality of budgets being allocated to a different one of the plurality of scheduling queues; selecting one of the plurality of scheduling queues; retrieving a type-1 thread from the selected scheduling queue when one of a first condition or a second condition is satisfied, the first condition being satisfied when the respective budget of the queue is not exhausted, and the second condition being satisfied when another one of the plurality of scheduling queues are empty; and executing the retrieved type-1 thread.

According to aspects of the disclosure, a system is provided comprising: a memory; and at least one processor operatively coupled to the memory, the at least one processor being configured to perform the operations of: instantiating a plurality of scheduler queues; instantiating a plurality of type-1 threads; assigning each of the plurality of type-1 threads to a respective scheduler queue; allocating a plurality of budgets to the plurality of scheduling of queues, each of the plurality of budgets being allocated to a different one of the plurality of scheduling queues; selecting one of the plurality of scheduling queues; retrieving a type-1 thread from the selected scheduling queue when one of a first condition or a second condition is satisfied, the first condition being satisfied when the respective budget of the queue is not exhausted, and the second condition being satisfied when another one of the plurality of scheduling queues are empty; and executing the retrieved type-1 thread.

According to aspects of the disclosure, a non-transitory computer-readable medium is provided that stores processor-executable instructions, which when executed by at least one processor cause the at least one processor to perform the operations of: instantiating a plurality of scheduler queues; instantiating a plurality of type-1 threads; assigning each of the plurality of type-1 threads to a respective scheduler queue; allocating a plurality of budgets to the plurality of scheduling of queues, each of the plurality of budgets being allocated to a different one of the plurality of scheduling queues; selecting one of the plurality of scheduling queues; retrieving a type-1 thread from the selected scheduling queue when one of a first condition or a second condition is satisfied, the first condition being satisfied when the respective budget of the queue is not exhausted, and the second condition being satisfied when another one of the plurality of scheduling queues are empty; and executing the retrieved type-1 thread.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
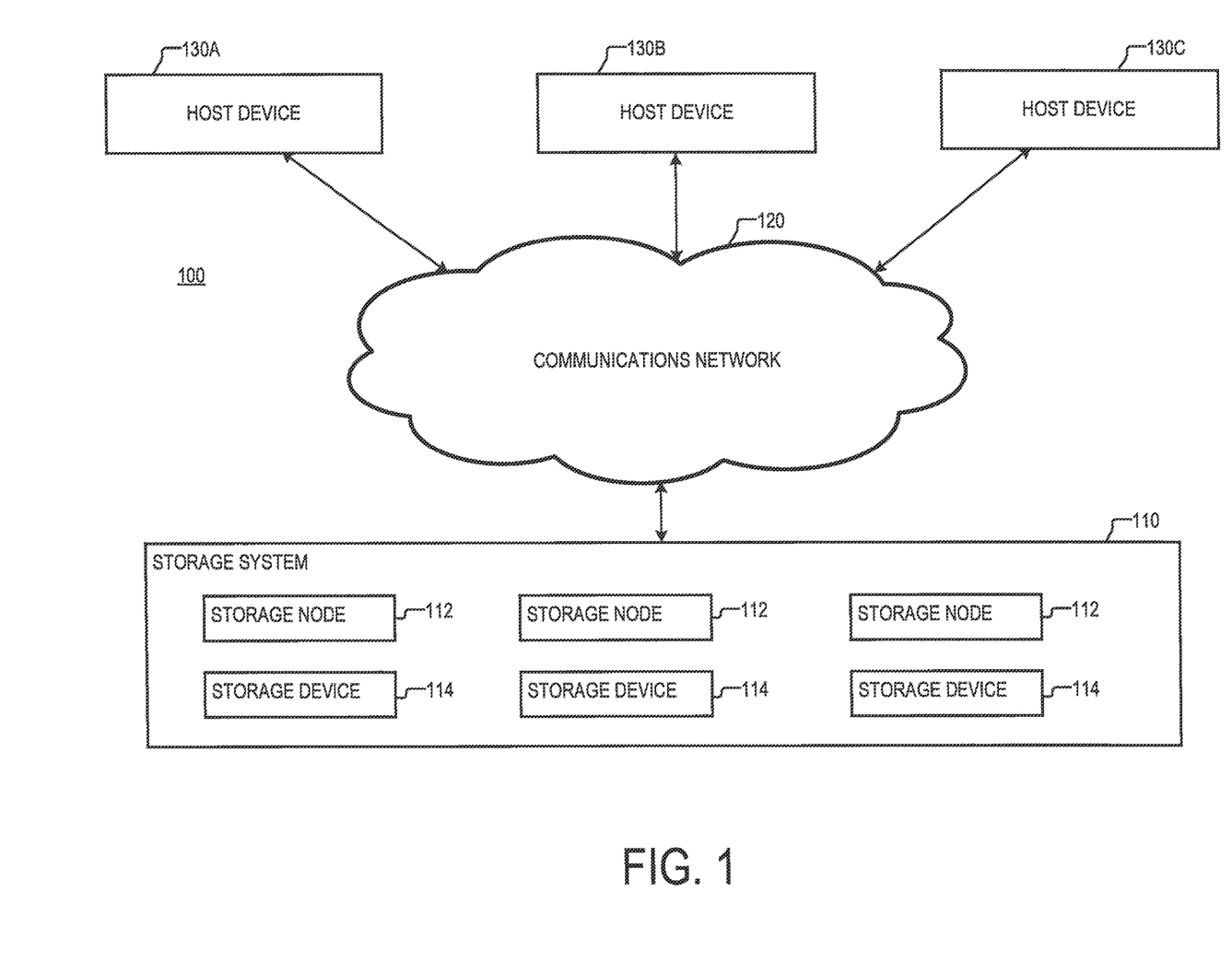
FIG. 1 is a diagram of an example of a storage system, according to aspects of the disclosure.

FIG. 1 is a diagram of an example of a system 100, according to aspects of the disclosure. The system 100 may include a storage system 110 that is coupled to one or more host devices 130 via a communications network 120. The storage system 110 may include a midrange storage system, an enterprise storage system, and/or any other suitable type of storage system. The storage system 110 may include a plurality of storage nodes 112 and storage devices 114. Each of the storage devices may include a solid-state drive (SSD), a hard disk, a non-volatile memory device, and/or any other suitable type of storage devices. In operation, the storage nodes 112 may retrieve and store data into the storage devices 114 in response to I/O requests that are received at the storage system 110 from the host devices 130. The communications network 120 may include a local area network (LAN), a wide area network (WAN), the Internet, and/or any or suitable type of communications network. Each of the host devices 130 may include a desktop computer, a laptop computer, a smartphone, a digital media player, and/or any other suitable type of electronic device.

Figure 2:
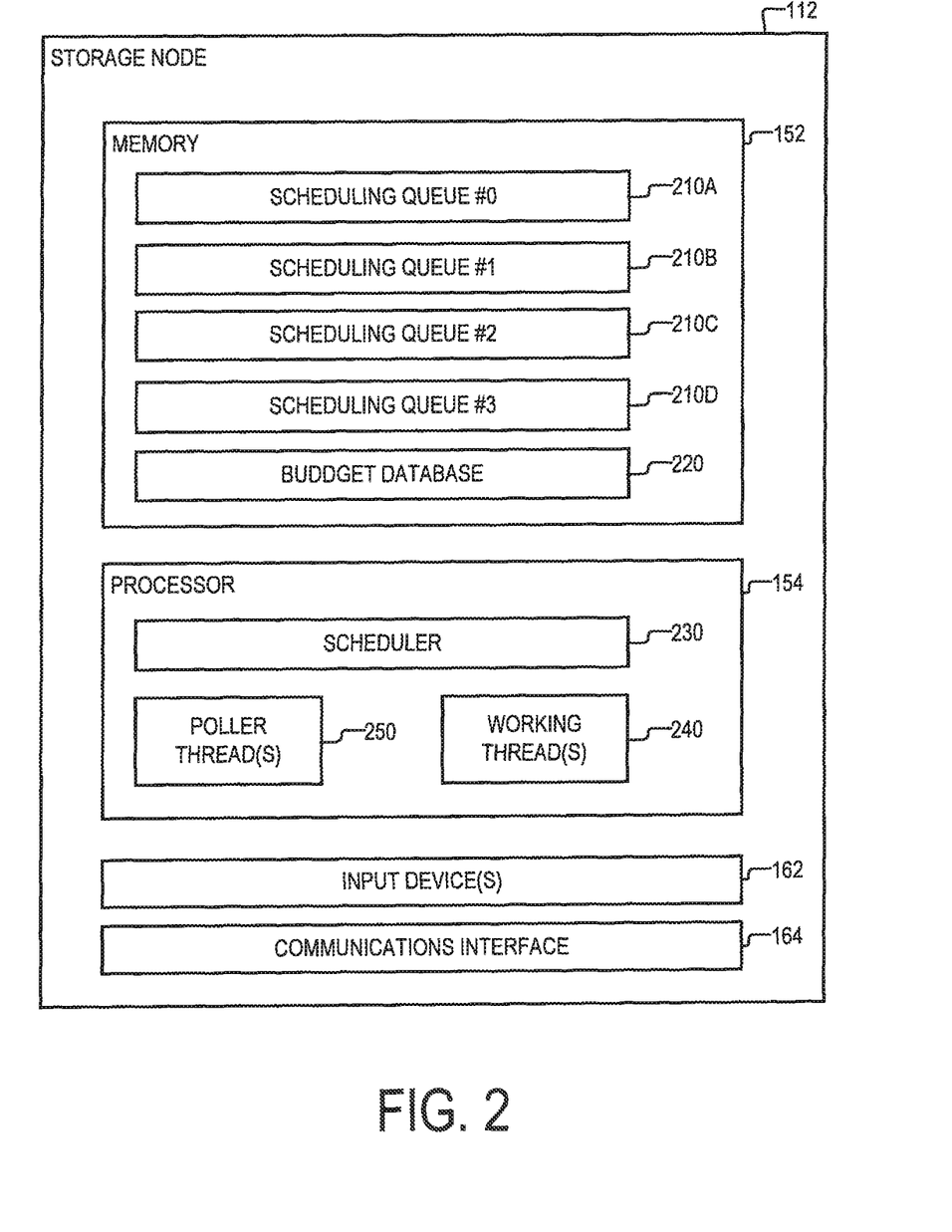
FIG. 2 is a diagram of an example of a storage node that is part of the storage system of FIG. 1.

FIG. 2 is a diagram of an example of a storage node 112, according to aspects of the disclosure. The storage node 112 may include a memory 152, a processor 154, input/output (I/O) device(s) 162, and communications interface(s) 164. The memory 152 may include any suitable type of volatile or non-volatile memory. For example, in some implementations, the memory 152 may include a random-access memory (RAM), a flash memory, a solid-state drive (SSD), a hard disk (HD) and/or any other suitable type of memory.

The processor 154 may include any suitable type of processing circuitry. For example, in some implementations, the processor 154 may include one or more of a general-purpose processor (e.g., an x86 processor, a RISC processor, etc.), an application-specific integrated circuit (ASIC), and a field-programmable gate array (FPGA). The I/O device(s) 162 may include one or more of a display, a speaker, a microphone, a keyboard, a printer, and/or any other suitable type of I/O device. The communications interface(s) 164 may include one or more of a Bluetooth interface, an Ethernet interface, an Infiniband interface, a WiFi interface, and/or any other suitable type of interface.

In some implementations, the processor 154 may be configured to execute a scheduler 230, one or more threads 240, and one or more poller threads 250. The scheduler 230 may be configured to synchronize the execution of at least the threads 240 and 250. The scheduler 230 may include one or more processor executable instructions that are configured to select a thread that is to be executed by the processor 154 and allocate the processor 154 to the selected thread. In some implementations, the scheduler 230 may be configured to execute processes 400, 500, and 800 (and/or the function 700), which are discussed further below with respect to FIGS. 4-8.

Each of the threads 240 may include a thread that is configured to, at least in part, complete I/O requests that are received at the storage system 110 from the host devices 130. Each of the poller threads 250 may include a thread that is configured to interact with the hardware of one or more components of the storage node 112 to detect when one or more operations have been completed by the components. For example, any of the poller threads 250 may be configured to interact with the hardware of a storage device to detect when one or more reads or writes that are being performed by the storage device have completed. Each of the poller thread 250 may be executed in accordance with a respective execution interval for that poller thread. For example, poller threads 250 that interact with high-latency storage devices may be executed at longer execution intervals. By contrast, poller threads 250 that interact with low-latency storage devices may be executed at shorter intervals.

In some implementations, the memory 152 may store a plurality of scheduling queues 210 and a budget database 220. During the operation of the storage node 112, any of the scheduling queues 210 may be empty or include one or more threads. According to the present disclosure, a thread is part of scheduling queue 210, when an identifier of that thread has been added to the queue. In this regard, the operation of adding a thread to one of the scheduling queues 210 may include adding an identifier corresponding to the thread to the scheduling queue 210. Similarly, the operation of removing a thread from one of the scheduling queues 210 may include an identifier corresponding to the scheduling queue.

Each of the scheduling queues 210 may be assigned a different index number. For example, the scheduling queue 210A may be assigned an index number of '0'; scheduling queue 210B may be assigned an index number of '1'; scheduling queue 210C may be assigned an index number of '2'; and scheduling queue 210D may be assigned an index number of '3'. Furthermore, each of the scheduling queues 210 may be assigned a priority. According to the present example, the higher the index number of a scheduling queue 210, the higher its priority. In this regard, the scheduling queue 210D may have the highest priority among the scheduling queues 210; the scheduling queue 210C may have the second highest priority among the scheduling queues 210; the scheduling queue 210D may have the third highest priority among the scheduling queues 210; and the scheduling queue 210A may have the lowest priority among the scheduling queues 210. Although in the present example the scheduling queues 210 are assigned different priorities by using index numbers, it will be understood that the present disclosure is not limited to any specific method for assigning priorities to the scheduling queues 210.

Each of the scheduling queues may be assigned a different budget. In some implementations, the budget of any of the scheduling queues 210 may specify the maximum amount of time per scheduling cycle, which threads that are part of the scheduling queue, are to be executed for. For example, if the budget of the scheduling queue 210A is 50 µs, the combined execution time of all threads in the queue cannot exceed 50 µs during a particular execution cycle. As is discussed further below, the budget for each of the scheduling queues 210 may be enforced by the scheduler 230. Specifically, to enforce the scheduling queue budgets, the scheduler 230 may be configured such that any of the threads 240 is scheduled only if the remaining budget of the scheduling queue 210, which the thread is part of, exceeds zero or if all more prioritized scheduling queues are empty. According to the present example, the storage node 112 implements a cooperative scheduling model in which each of the threads that are executed on the processor 154 yields the processor 154 voluntarily. However, it will be understood that the present disclosure is not limited to any specific type of scheduling model.

According to aspects of the disclosure, the execution of the threads in the scheduling queues 210 may be organized in scheduling cycles. A scheduling cycle may be a period of the operation of the storage node 112. According to the present example, in each of the scheduling cycles only threads that are part of the scheduling queues 210 are executed, while other threads are executed in time gaps between the execution cycles. Such other threads may be scheduled for execution by using another type of scheduling queue (not shown), and/or in accordance with other types of scheduling cycles, such as poller intervals. The present disclosure is not limited to any specific duration of the execution cycles. For example, the execution cycles may be 200 µs long, 300 µs long, etc.

According to aspects of the disclosure, the budget that is assigned to each of the scheduling queues 210 applies for the duration of a particular execution cycle. In this regard, at the begging of each scheduling cycle, the budget of each of the scheduling queues 210 may be set (or reset) to its maximum value, after which it is gradually decremented over the duration of the execution cycle, until the next execution cycle starts, at which time the budget is set again to its maximum value, to be gradually decremented once more as the next execution cycle progresses. In some implementations, the budget of the scheduling queues 210 for a current execution cycle is identified in the budget database 220. An example of a budget database is discussed in further detail with respect to FIG. 3A below.

According to aspects of the disclosure, the duration of each execution cycle may be equal to total sum of the respective budgets of all scheduling queues 210. In some implementations, all of the scheduling queues 210 may have the same budget. Alternatively, in some implementations, at least some of the scheduling queues 210 may have different budgets, such that one of the scheduling queues 210 has a larger (or smaller budget) than another one of the scheduling queues 210. According to the present example, the budget of each of the scheduling queues 210 is specified in time units (e.g., microseconds). However, alternative implementations are possible in which the budget of any of the scheduling queue is specified by using another metric, such as CPU cycles. Stated succinctly, the present disclosure is not limited to any specific way of defining the budgets of the scheduling queues 210.

According to aspects of the disclosure, a thread 240 may be placed in one of the scheduling queues, when that thread is ready to be executed. When the same thread is waiting for a hardware access to complete (e.g., waiting for a disk read or disk write to complete), the same thread may be suspended until the hardware access is completed. When the thread 240 is suspended, the thread may be removed from the thread's respective scheduling queue and added to a waiting queue (not shown). After the thread 240 is placed in the waiting queue, one of the poller threads 250 may poll the hardware device to detect when the hardware access is completed. When the hardware access is completed, the poller thread 250 may generate an event. In response to the event, the thread 240 may be transitioned from the suspended state back to the ready state, by removing the thread 240 from the waiting queue, and adding the thread 240 back to the its respective scheduling queue 210.

According to aspects of the disclosure, each of the scheduling queues 210 may be associated with a different class of service (cos). In this regard, the scheduling queues 210 may be used to accomplish prioritization by dividing the threads 240 into classes based on the function, which each of the thread performs. Threads 240 that perform a higher-priority function (e.g., threads that need to be executed with a lower latency) may be placed in a first scheduling queue 210 that has a higher budget. By contrast, threads 240 that perform a lower-priority function (e.g., threads that can be executed with a higher latency) can be placed in a second scheduling queue 210 that has a higher (or lower) budget than the first scheduling queue 210.

Figure 3A:
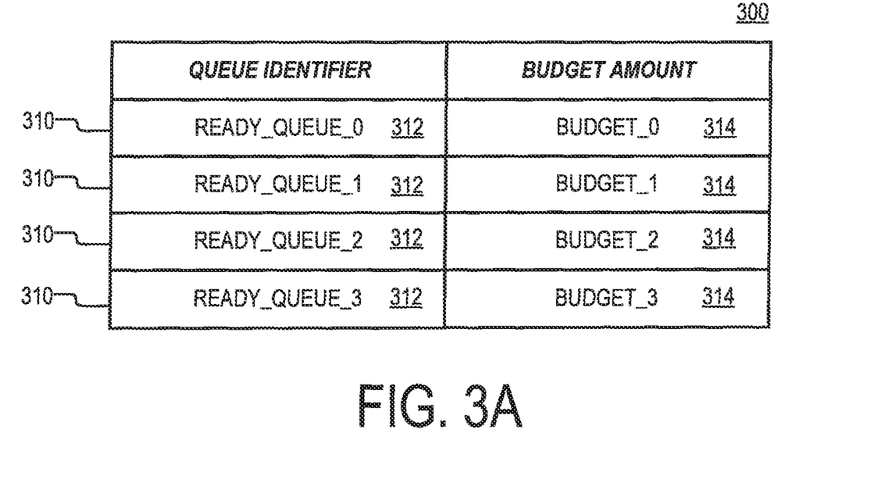
FIG. 3A is a diagram of an example of a budget database, according to aspects of the disclosure.

FIG. 3A is a diagram of an example of a budget database 300, according to aspects of the disclosure. In some illustrated, the budget database may be the same or similar to the budget database 220, which is discussed above with respect to FIG. 2. According to the present example, the budget database 300 may include one or more data structures that are configured to associate each of the scheduling queues 210 with a respective budget for that thread, for a given execution period. As illustrated the budget database 300 may include a plurality of entries 310. Each of the entries 310 may include a respective identifier 312 of a different one of the scheduling queues 210 and an indication of a budget 314 that is allocated to the scheduling queue 210. The indication of the budget 314 in any of the entries 310 may include any suitable type of number, string, or alphanumerical string that has been allocated to that entry's respective scheduling queue 210, for a given execution period. Although in the present example a separate database is kept, which identifies the available budget of each of the scheduling queues 210, the present disclosure is not limited to any specific method for keeping track of the budgets of the scheduling queues 210. For example, in some implementations, an indication of the budget that is available for each scheduling queue 210 may be stored inside the scheduling queue itself.

Figure 3B:
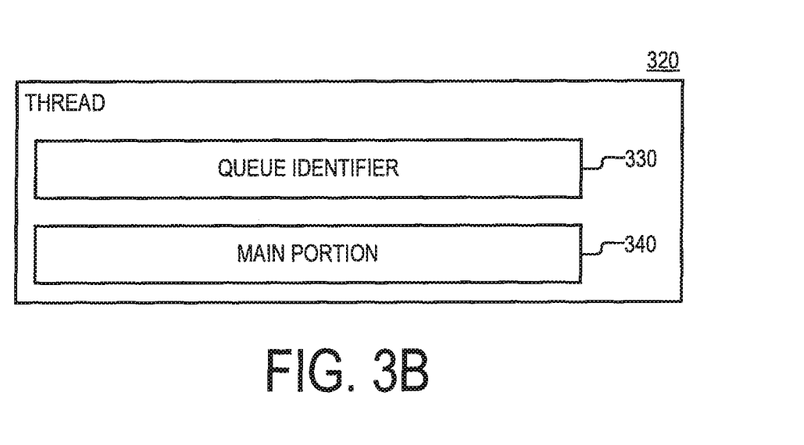
FIG. 3B is a diagram of an example of a thread, according to aspects of the disclosure.

FIG. 3B is a diagram of an example of a thread 320. In some implementations, the thread 320 may be the same or similar to any of the threads 240, which are discussed above with respect to FIG. 2. As illustrated, the thread 320 may include a queue identifier 330 and a main portion 340. In some implementations, the queue identifier 330 may include any suitable number, string, or alphanumerical string that identifies a respective scheduling queue 210 where the thread 320 is to be placed when the thread is ready for execution. When the thread 320 is instantiated, the thread identifier can be set to a default value. Afterwards, the value of the of the thread identifier can be changed (e.g., by the scheduler 230 and/or the processor 154), if it is desired to place the thread 320 in a higher-priority or a lower-priority scheduling queue 210. The main portion 340 may include context data, code, and/or any other suitable type of that is normally part of application threads. In this regard, it will be understood that the example of FIG. 3B is not limited to any specific implementation of the thread 320, for as long as that implementation includes a queue identifier, such as the queue identifier 330. Furthermore, although in the example of FIG. 3B, the thread 320 includes a queue identifier 320, alternative implementations are possible in which the queue identifier 320 is omitted.

Figure 4:
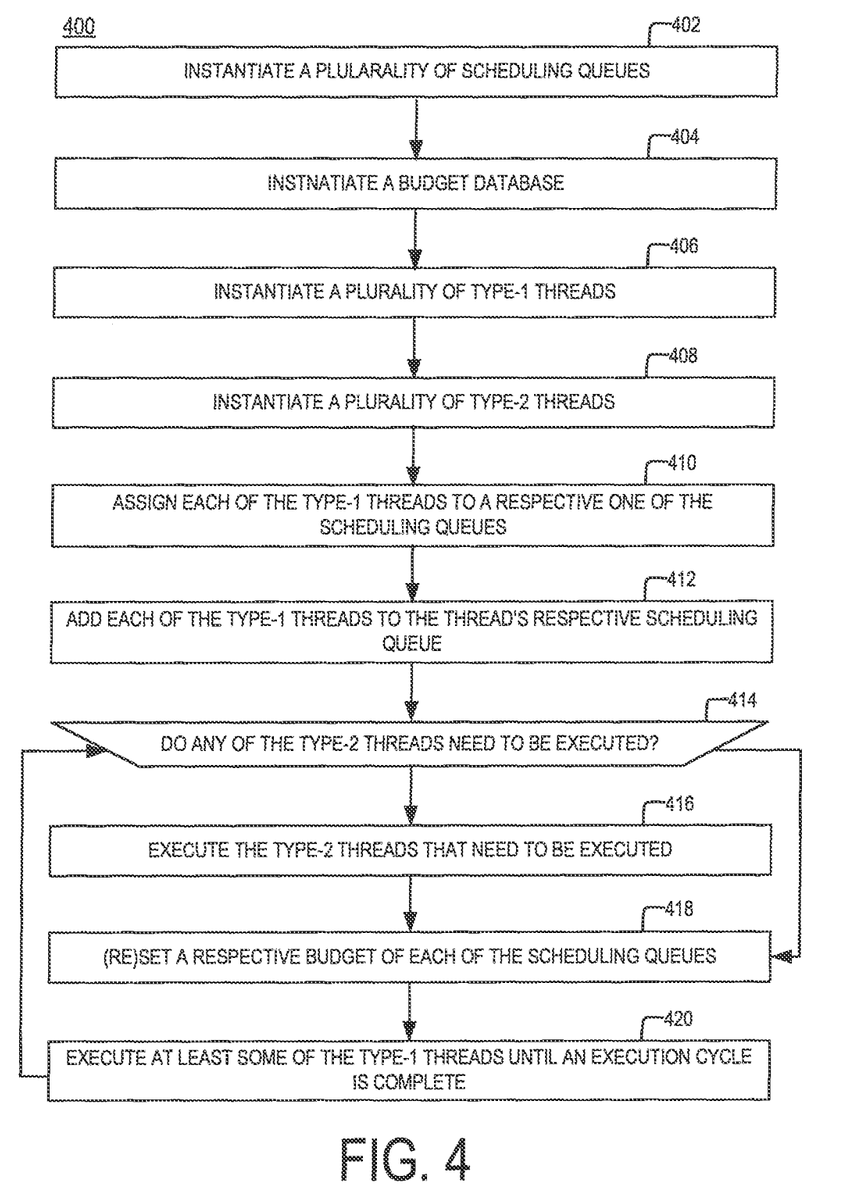
FIG. 4 is a flowchart of an example of a process, according to aspects of the disclosure.

FIG. 4 is a flowchart of an example of a process 400, according to aspects of the disclosure.

At step 402, a plurality of scheduling queues is instantiated. In some implementations, the plurality of scheduling queues may be the same or similar to the scheduling queues 210, which are discussed above with respect to FIG. 2.

At step 404, a budget database is instantiated for the plurality of scheduling queues. In some implementations, the budget database may be the same or similar to the budget database 300, which is discussed above, with respect to FIG. 2.

At step 406, a plurality of type-1 threads is instantiated. In some implementations, each of the type-1 threads may be the same or similar to one of the threads 240 and/or the thread 320, which are discussed above with respect to FIGS. 2 and 3.

At step 408, a plurality of type-2 threads are instantiated. In some implementations, each of the plurality of type-2 threads may be the same or similar to the poller threads 250, which are discussed above with respect to FIG. 2. Additionally or alternatively, in some implementations, the type-1 threads may include any suitable thread that is selected for execution from the scheduling queues (instantiated at step 402), and the type-2 threads may include any suitable type of thread that is selected for execution by using a "ready" queue, other than the scheduling queues that are instantiated at step 402. In other words, according to the present example, the scheduling queues (instantiated at step 402) are used to schedule only the type-threads, whereas the type-2 threads are scheduled by using alternative means.

At step 410, each of the type-1 threads is assigned to a respective one of the scheduling queues (instantiated at step 402). In some implementations, assigning any of the type-1 threads to a respective scheduling queue may include changing the value of a queue identifier that is part of that thread to identify the respective scheduling queue. The queue identifier may be the same or similar to the queue identifier 330, which is discussed above with respect to FIG. 3B.

At step 412, each of the type-1 threads is added to the thread's assigned scheduling queue. As noted above, adding any of the type-1 threads to the thread's respective scheduling queue may include adding an identifier corresponding to that thread to the respective scheduling queue.

At step 414, a determination is made whether any of the type-2 threads needs to be executed. When any of the type-2 threads is a poller thread, that type-2 thread may be executed only when its scheduling interval has passed. In this regard, in instances in which a type-2 thread is a poller thread, the determination may entail detecting whether the scheduling interval of the poller thread has passed. If any of the type-2 threads needs to be executed the process 400 proceeds to step 416. Otherwise, if none of the type-2 threads needs to be executed the process 400 proceeds to step 418.

At step 416, the type-2 threads that need to be executed are executed.

At step 418, a respective budget is assigned to each of the scheduling queues. In some implementations, assigning a respective budget to any of the scheduling queues may include: (i) retrieving an identifier of the scheduling queue, (ii) performing a search of the budget database (based on the retrieved identifier) to obtain the budget database entry that corresponds to the scheduling queue, (iii) updating the obtained database entry to include an indication of available budget that is equal to the budget that is allotted to scheduling queue for an entire execution cycle. In some implementations, step 418 may be performed before the execution cycle has commenced.

At step 420, at least some of the type-1 threads are executed. In some implementations, the execution of step 420 begins at the start of the execution cycle and ends at the finish of the same execution cycle. After step 420, the process 400 returns to step 414. The manner in which step 420 is performed is discussed further below with respect to FIG. 5.

Figure 5:
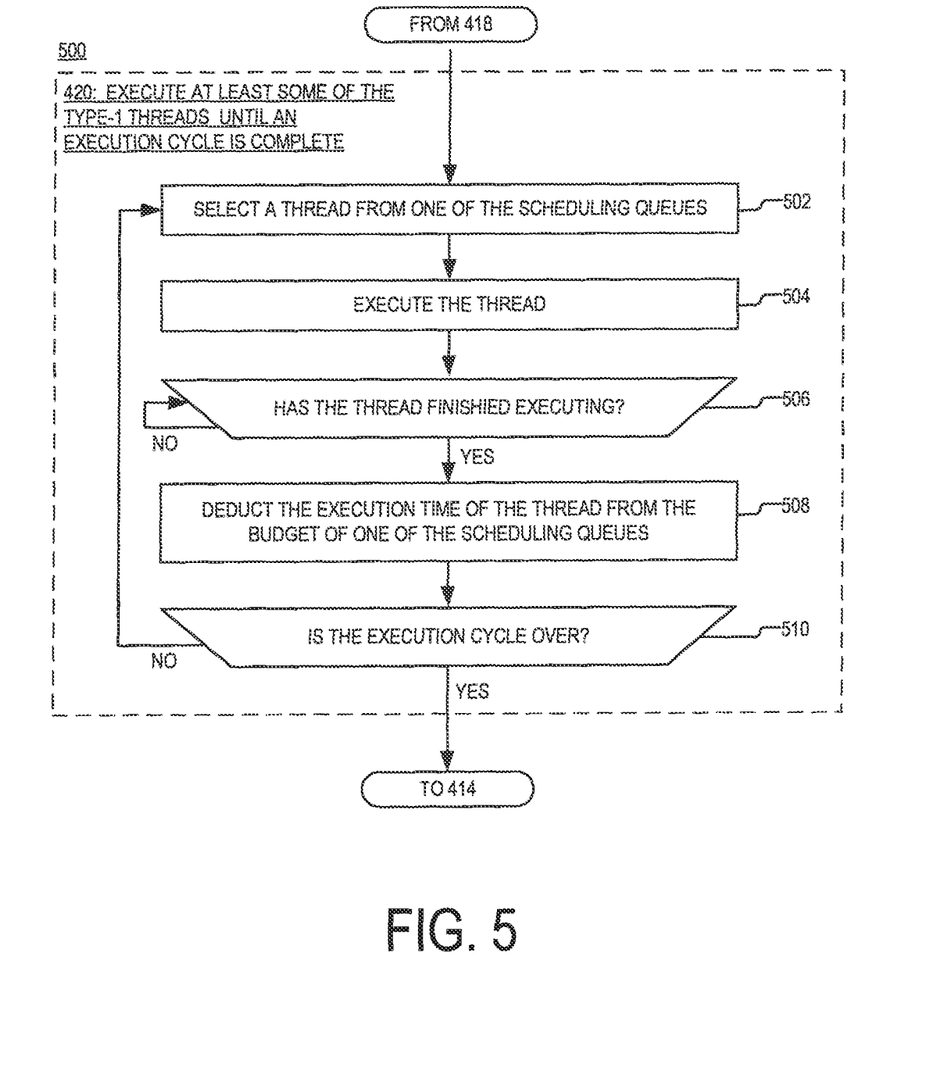
FIG. 5 is a flowchart of an example of a process, according to aspects of the disclosure.

FIG. 5 is a flowchart of a process 500 for executing one or more type-1 threads, as specified by step 420 of the process 400. As noted above, in some implementations, the process 500 may executed entirely within the same execution cycle. At step 502, a type-1 thread is selected from one of the scheduling queues that are instantiated at step 402. In some implementations, step 502 may be performed in the manner discussed with respect to FIGS. 6 and 7. At step 504, a processor is allocated to the selected type-1 thread and the selected type-1 thread is executed. At step 506, the process 500 waits until the selected type-1 thread has stopped executing. After the selected thread has stopped executing, the process proceeds to step 508. At step 508, the execution time of the selected thread is determined. At step 508, the execution time of the selected thread is deducted from the budget of one of the scheduling queues (that are instantiated at step 402). At step 510, a determination is made if the execution cycle is over. If the execution cycle is over, the process 500 returns to step 414. Otherwise, if the execution cycle is not over, the process 500 returns to step 502.

In some implementations, the execution time of the selected type-1 thread may include the duration of the most recent period in which the type-1 thread has been executed continuously (e.g., without yielding the processor used to execute the selected type-1 thread). Additionally or alternatively, in some implementations, the execution time of the selected type-1 thread may be the duration of the period in which step 504 is performed.

As is discussed further below, with respect to FIGS. 6 and 7, a type-1 thread can be selected for execution under two different sets of circumstances. Specifically, a type-1 thread may be selected for execution (at step 502) when, (1) the budget of the scheduling queue where the type-1 thread is placed has not been exhausted yet, or (2) the budget of the scheduling queue where the type-1 thread is placed has been exhausted, but an empty scheduling queue has a remaining budget. An empty scheduling queue may have a remaining budget, when no type-1 threads are present in the scheduling queue at the beginning of the execution cycle or when one or more type-1 threads that are present in the scheduling queue terminate midway through the execution cycle.

When the scheduling queue where the selected type-1 thread is placed has not been exhausted yet, the execution time of the type-1 thread is deducted from the budget of that scheduling queue. On the other hand, when the budget of the scheduling queue which contains the type-1 thread has been exhausted, but there is an empty scheduling queue whose budget has not been exhausted yet, the execution time of the selected type-1 thread may be deducted from the budget of the scheduling queue of the empty type-1 thread. In some implementations, when the budget of the scheduling queue where the type-1 thread has been placed is exhausted, that type-1 thread may be execution only if there is a lower-priority scheduling queue that has available budget. In some implementations, deducting the execution time of a thread from the budget of a scheduling queue, may include a retrieving an identifier of the scheduling queue, performing a search of a budget database based on the identifier to retrieve a database entry corresponding to the scheduling queue, and updating the entry by subtracting the execution time from an indication of available budget that is present in the entry.

Figure 6:
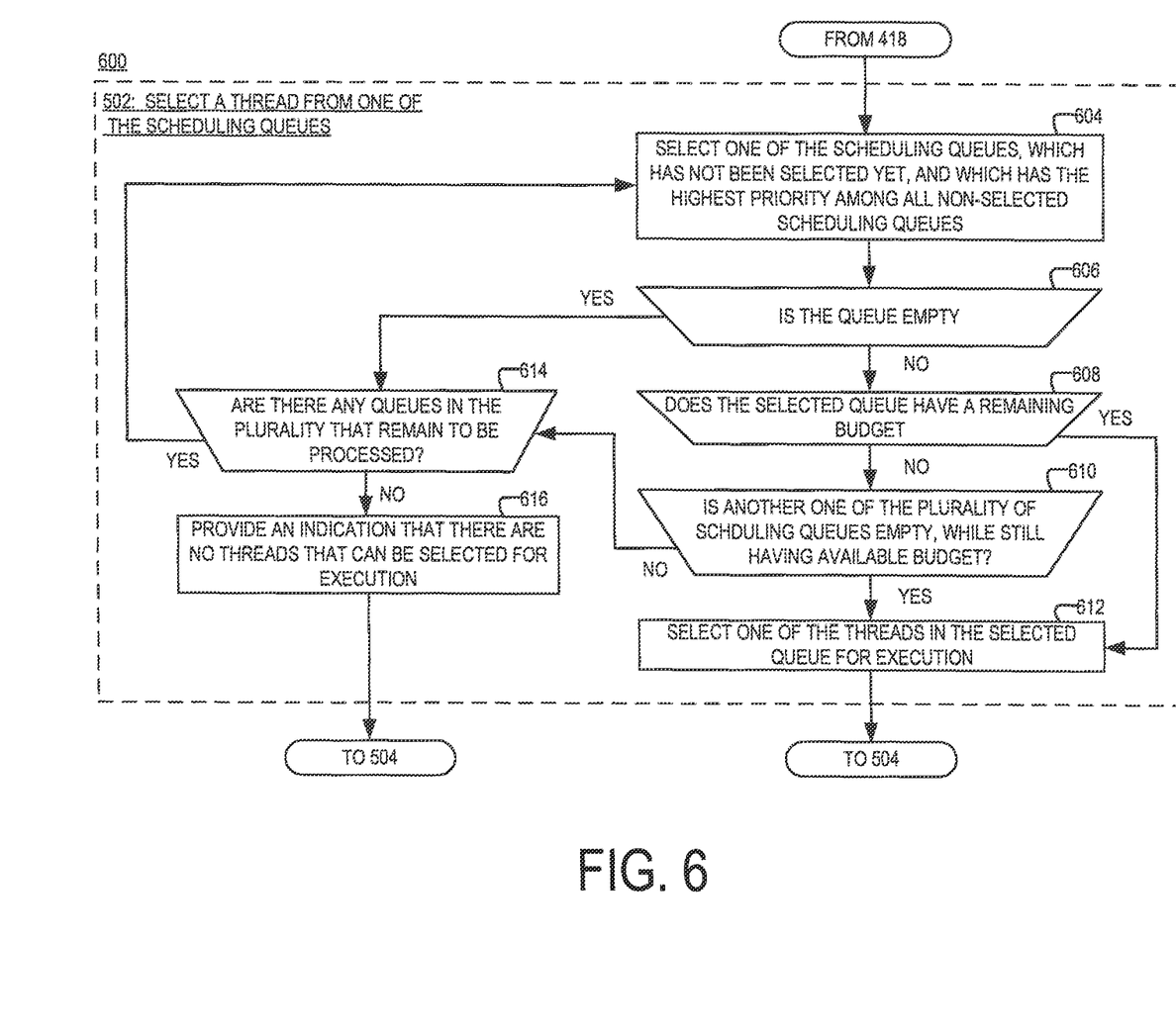
FIG. 6 is a flowchart of an example of a process, according to aspects of the disclosure.

FIG. 6 is a flowchart of an example of a process 600 for selecting a type-1 thread from one of a plurality of scheduling queues, as specified by step 502 of the process 500. At step 604, the highest-priority scheduling queue, which has not been selected during the execution of the process 600 is selected. At step 606, a determination is made if the selected scheduling queue is empty. If the selected scheduling queue is empty, the process 600 proceeds to step 614. Otherwise, if the selected scheduling queue is not empty, the process 600 proceeds to step 608. At step 608, a determination is made if the selected queue has a remaining budget. If the selected queue has a remaining budget, the process 600 proceeds to step 612. Otherwise, if the budget of the selected scheduling queue has been exhausted, the process proceeds to step 610. At step 610, a determination is made if another one of the plurality of scheduling queues is empty, while still having available budget. If the another one of the plurality of scheduling queues is empty while still having a remaining budget, the process 600 proceeds to step 612. Otherwise, the process 600 proceeds to step 614. At step 612, one of the type-1 threads in the scheduling queue (which is selected at step 604) is selected for execution. At step 614, a determination is made if each of the plurality of scheduling queues has already been selected once (during a previous iteration of steps 604-614). If there are scheduling queues that have not be selected yet (during the execution of the process 600), the process 600 returns to step 604. Otherwise, if all scheduling queues in the plurality (identified at step 602) have already been selected once during the current execution of the process 600, the process 600 proceeds to step 616. At step 616, an indication is provided (to the entity invoking the process 600) that there are no type-1 threads in the plurality of scheduling queues that can be selected for execution.

Figure 7:
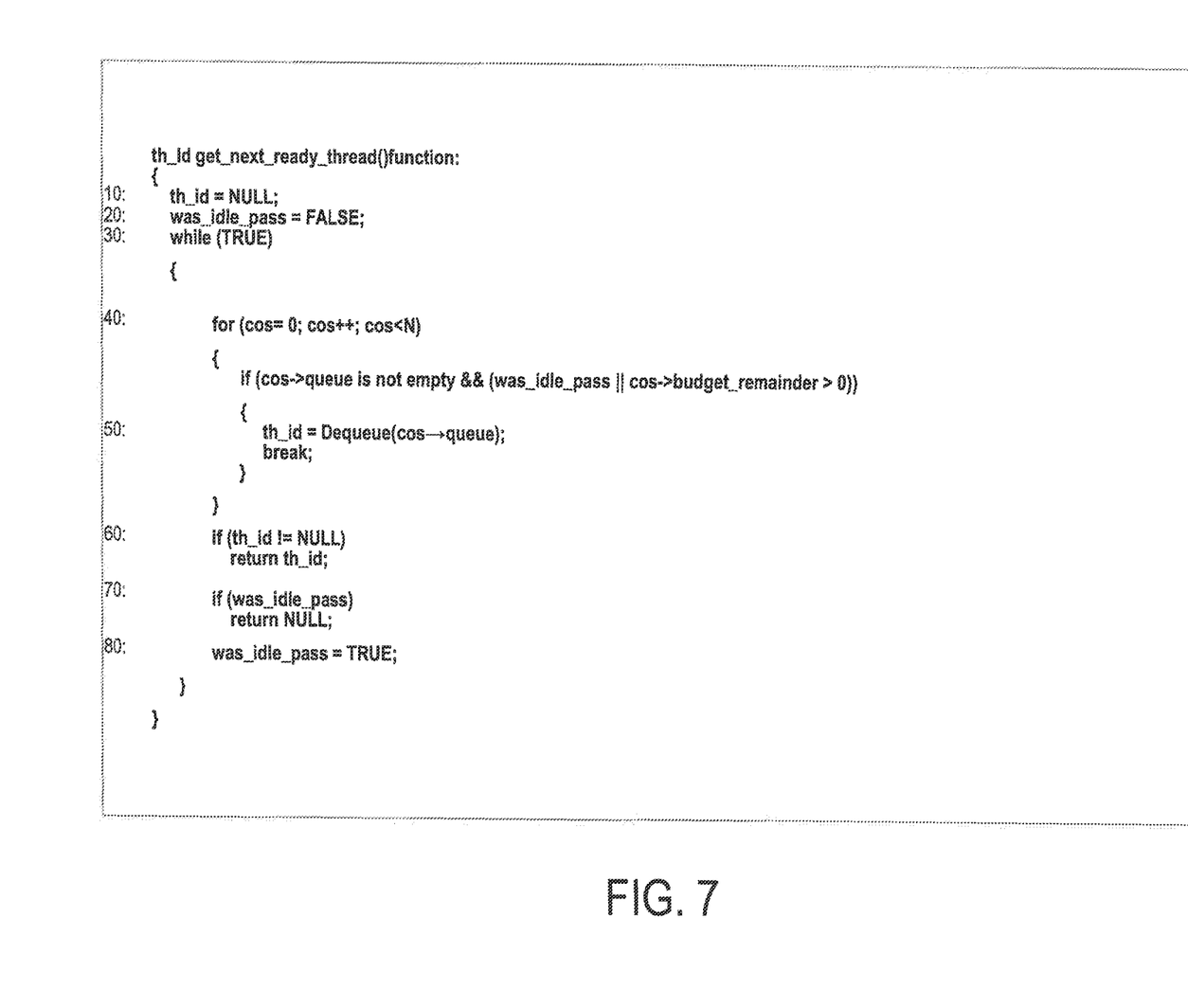
FIG. 7 is a diagram showing pseudocode of a function for selecting a thread, according to aspects of the disclosure.

FIG. 7 shows pseudocode of a function 700 for selecting a thread for execution. As noted above, in some implementations, function 700 may be used to complete step 502 of the process 500, which is discussed above with respect to FIG. 5. At line 10, a variable th_id is initialized. The variable th_id may be a pointer to the thread that is selected for execution by the function 700. At line 20, an was_idle_pass flag is initialized. At line 30, a while loop is started. At line 40, a for loop is started, which is based on a counter cos. At line 50, a thread is selected from the scheduling queue that has an index (or priority) that is equal to the current value of cos (hereinafter "current scheduling queue"). However, according to the present example, the thread is selected only if the current scheduling queue has a remaining budget or the scheduling queue that is processed in the previous iteration of the for loop (line 40) is empty, while also having remaining budget. At line 60, if a thread is selected (at line 50), the obtained thread is returned. At line 70, if no thread was selected during the most recent execution of the for loop (line 40), and no thread was selected during the previous execution of the for loop (line 40), the function 700 returns. At line 80, if no thread was selected during the most recent execution of the for loop (line 4), but a thread was selected during the previous execution of the for loop (line 40), the was_idle_pass flag is set to true.

As can be readily appreciated, the function 700 is configured to terminate, in the worst case scenario, after two complete iterations of the for loop (line 40). This guarantees consistent and predictable execution time for the function 700, which in turn makes the function 700 advantageous for use in storage systems (and/or other computing systems) that operate under tight timing constraints.

Figure 8:
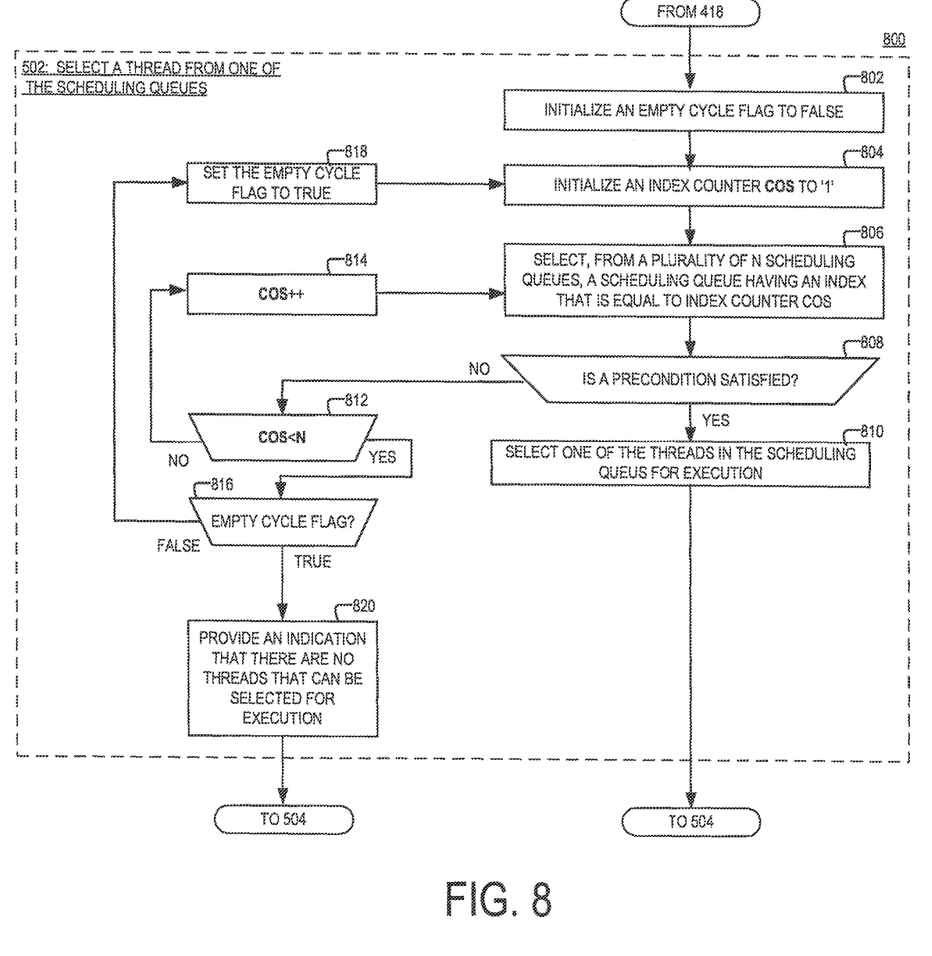
FIG. 8 is a flowchart of an example of a process, according to aspects of the disclosure.

FIG. 8 is a flowchart of an example of a process 600 for selecting a type-1 thread from one of a plurality of scheduling queues, as specified by step 502 of the process 500. The process 800 implements, at least in part, the algorithm of function 700, which is discussed above with respect to FIG. 7.

At step 802, an empty cycle flag is initialized to FALSE. At step 804, an index counter COS is initialized to an initial value (e.g., '1'). At step 806, one of a plurality of scheduling queues is selected, which has an index (or priority) that is equal to the counter COS. According to the present example, the plurality of scheduling queues includes N scheduling queues, where N is a positive integer greater than 1. At step 808, a determination is made if a precondition is satisfied. According to the present example, the precondition satisfied when the selected scheduling queue is non-empty and the selected scheduling queue has an available budget. Furthermore, according to the present example, the precondition is also satisfied when the selected scheduling queue is empty, and the empty cycle flag is set to TRUE. If the precondition is satisfied, the process 800 proceeds to step 810. Otherwise, the process 800 proceeds to step 812. At step 810, a type-1 thread that is part of the scheduling queue (selected at step 806) is selected for execution. At step 812, a determination is made if the index counter COS is less than the total number of scheduling queues in the plurality. If the counter COS is less than the total number of scheduling queues, the process 800 proceeds to step 814. Otherwise, the process 800 proceeds to step 816. At step 814, the index counter COS is incremented. At step 816, a determination is made if the empty cycle flag is currently TRUE. If the empty cycle flag is currently FALSE, the process proceeds 800 proceeds to step 818. Otherwise, if the empty cycle is currently TRUE, the process 800 proceeds to step 820. At step 818, the empty cycle flag is set to TRUE. At step 820, an indication is provided that there are no threads that that can be selected for execution.

In some respects, steps 804-814 are arranged traverse a plurality of scheduling queues to determine whether any of the scheduling queues contains a type-1 thread that can be selected for execution. A series of executions of steps 804-814 in which all scheduling queues are processed is herein referred to as a "selection cycle." A selection cycle in which no type-1 thread is selected for execution is herein referred to as an "empty cycle." As can be readily appreciated, the process 800 is configured to terminate, in the worst case scenario, after two complete empty cycles. This guarantees consistent and predictable execution time for the process 800, which in turn makes the process 800 advantageous for use in storage systems (and/or other computing systems) that operate under tight timing constraints.

At least some of the steps discussed with respect to FIGS. 1-8 may be performed in parallel, in a different order, or altogether omitted. Although the example of FIGS. 1-8 is provided in the context of a storage node, the multi-queue technique for thread scheduling can be implemented on any suitable type of computing device. In this regard, it will be understood that the present disclosure is not limited to storage systems only. In the example of the present disclosure, the threads 240 are used to service I/O requests that are received at the storage system 110 (e.g., data read requests, data write requests, etc.) However, the present disclosure is not limited to any specific type of thread being scheduled by using the multi-queue technique for thread scheduling, which is described with respect to FIGS. 1-8. Furthermore, as used throughout the disclosure, the term "scheduling queue" may refer to one or more data structures that configured to identify threads that are available for execution. In the present disclosure, the scheduling queues 210 are first-in-first-out data structures. However, alternative implementations are possible in which the scheduling queues 210 are not first-in-first-out data structures. Stated succinctly, the present disclosure is not limited to any specific implementation of the scheduling queues 210. For the purposes of the present disclosure, the terms "process" and "thread" may be used interchangeably to refer to a sequence of processor-executable instructions that can be managed independently by a scheduler that is part of an operating system and/or another type of scheduler that is itself managed by the operating system scheduler.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a computing system, comprising:
instantiating a plurality of scheduling queues;
instantiating a plurality of type-1 threads;
assigning each of the plurality of type-1 threads to a respective scheduling queue;
allocating a plurality of budgets to the plurality of scheduling of queues, each of the plurality of budgets being allocated to a different one of the plurality of scheduling queues, the plurality of budgets being allocated for a duration of a scheduling cycle;
selecting one of the plurality of scheduling queues;
retrieving a type-1 thread from the selected scheduling queue when one of a first condition or a second condition is satisfied, the first condition being satisfied when the respective budget of the queue is not exhausted, and the second condition being satisfied when another one of the plurality of scheduling queues is empty;
executing the retrieved type-1 thread; and
executing one or more type-2 threads after the scheduling cycle is completed and before a next scheduling cycle has begun.

2. The method of claim 1, wherein the second condition is determined to be satisfied further upon confirming that the budget of the selected scheduling queue is exhausted.

3. The method of claim 1, wherein the second condition is determined to be satisfied further upon confirming that all scheduling queues in the plurality of scheduling queues, which have a higher priority than the selected scheduling queue, are empty.

4. The method of claim 1, wherein the respective budget of any of the scheduling queues specifies a maximum amount of time for which threads in that scheduling queue can be executed.

5. The method of claim 1, wherein assigning each of the plurality of threads to a respective scheduling queue includes:
retrieving a queue identifier from the thread;
selecting one of the plurality of scheduling queues based on the retrieved identifier; and
adding the thread to the selected queue.

6. The method of claim 1, wherein, wherein the selected scheduling queue is non-empty, and the selected scheduling queue has a highest priority among all non-empty scheduling queues in the plurality of scheduling queues.

7. A system comprising:
a memory; and at least one processor operatively coupled to the memory, the at least one processor being configured to perform the operations of:
instantiating a plurality of scheduling queues;
instantiating a plurality of type-1 threads;
assigning each of the plurality of type-1 threads to a respective scheduling queue;
allocating a plurality of budgets to the plurality of scheduling of queues, each of the plurality of budgets being allocated to a different one of the plurality of scheduling queues, the plurality of budgets being allocated for a duration of a scheduling cycle;
selecting one of the plurality of scheduling queues;
retrieving a type-1 thread from the selected scheduling queue when one of a first condition or a second condition is satisfied, the first condition being satisfied when the respective budget of the queue is not exhausted, and the second condition being satisfied when another one of the plurality of scheduling queues is empty; and executing the retrieved type-1 thread; and
executing one or more type-2 threads after the scheduling cycle is completed and before a next scheduling cycle has begun.

8. The system of claim 7, wherein the second condition is satisfied when the budget of the selected scheduling queue is exhausted.

9. The system of claim 7, wherein the second condition is satisfied when all scheduling queues in the plurality of scheduling queues, which have a higher priority than the selected scheduling queue, are empty.

10. The system of claim 7, wherein the respective budget of any of the scheduling queues specifies a maximum amount of time for which threads in that scheduling queue can be executed.

11. The system of claim 7, wherein assigning each of the plurality of threads to a respective scheduling queue includes:
retrieving a queue identifier from the thread;
selecting one of the plurality of scheduling queues based on the retrieved identifier; and
adding the thread to the selected queue.

12. The system of claim 7, wherein the selected scheduling queue is non-empty, and the selected scheduling queue has a highest priority among all non-empty scheduling queues in the plurality of scheduling queues.

13. A non-transitory computer-readable medium storing processor-executable instructions, which when executed by at least one processor cause the at least one processor to perform the operations of:
instantiating a plurality of scheduling queues;
instantiating a plurality of type-1 threads;
assigning each of the plurality of type-1 threads to a respective scheduling queue;
allocating a plurality of budgets to the plurality of scheduling of queues, each of the plurality of budgets being allocated to a different one of the plurality of scheduling queues, the plurality of budgets being allocated for a duration of a scheduling cycle;
selecting one of the plurality of scheduling queues;
retrieving a type-1 thread from the selected scheduling queue when one of a first condition or a second condition is satisfied, the first condition being satisfied when the respective budget of the queue is not exhausted, and the second condition being satisfied when another one of the plurality of scheduling queues is empty;
executing the retrieved type-1 thread; and
executing one or more type-2 threads after the scheduling cycle is completed and before a next scheduling cycle has begun.

14. The non-transitory computer-readable medium of claim 13, wherein the second condition is satisfied when the budget of the selected scheduling queue is exhausted.

15. The non-transitory computer-readable medium of claim 13, wherein the second condition is satisfied when all scheduling queues in the plurality of scheduling queues, which have a higher priority than the selected scheduling queue, are empty.

16. The non-transitory computer-readable medium of claim 13, wherein the respective budget of any of the scheduling queues specifies a maximum amount of time for which threads in that scheduling queue can be executed.

17. The non-transitory computer-readable medium of claim 13, wherein assigning each of the plurality of threads to a respective scheduling queue includes:
retrieving a queue identifier from the thread;
selecting one of the plurality of scheduling queues based on the retrieved identifier; and
adding the thread to the selected queue.

\* \* \* \* \*